(12) United States Patent
Hitchin

(10) Patent No.: US 6,679,299 B1
(45) Date of Patent: Jan. 20, 2004

(54) ROD CLIP AND APPARATUS

(76) Inventor: Peter James Hitchin, 7/54 Rene Place, Rene Street, Noosaville, Queensland 4566 (AU)

(\*) Notice: Subject to any disclaimer, the term of this patent is extended or adjusted under 35 U.S.C. 154(b) by 0 days.

(21) Appl. No.: 10/110,733

(22) PCT Filed: Oct. 18, 2000

(86) PCT No.: PCT/AU00/01262
§ 371 (c)(1),
(2), (4) Date: Jul. 23, 2002

(87) PCT Pub. No.: WO01/29347
PCT Pub. Date: Apr. 26, 2001

(30) Foreign Application Priority Data

Oct. 18, 1999 (AU) .................................................. PQ4486

(51) Int. Cl.⁷ ................................................. B21F 15/06
(52) U.S. Cl. ........................ 140/57; 29/453.56; 52/719; 140/11
(58) Field of Search .................... 29/816, 243.56; 52/719; 140/11, 53, 56, 57, 93 R, 93 A, 93 D, 93.4; 245/3; 256/57

(56) References Cited

U.S. PATENT DOCUMENTS 540,204 A * 5/1895 Aylworth et al. .......... 29/243.56
1,086,732 A * 2/1914 Schoenthaler ................. 52/719
1,986,528 A * 1/1935 Ranger .......................... 52/719
5,022,292 A * 6/1991 Hammer et al. .......... 29/243.56
5,881,452 A * 3/1999 Nowell, III et al. .......... 29/816

\* cited by examiner

Primary Examiner—Lowell A. Larson
(74) Attorney, Agent, or Firm—Hahn Loeser & Parks LLP; Laura G. Barrow

(57) ABSTRACT

A clip is disclosed which can be used to fabricate the lattice structure of reinforcing rods of the type used in the construction of steel rod reinforced concrete slabs. An apparatus to fasten those clips in position is also disclosed The preferred clip (1) has a substantially rectangular body (2). A recess (3) extends from a first face (4) of the body (2) towards an opposite face (5). The recess (3) terminates in an arcuate portion (6). The inner edges (7a, b) of the recess (3) are convergent towards the arcuate portion (6). The apparatus has an aperture (13) in a base plate (12). Stops (18a, b, c) on the plate (12) suitably position the apparatus whereupon a shearing plate (32) can shear a clip (1) from a stack of such clips to pass through the aperture (13) wherein the arcuate portion (6) of the clip (1) engages the upper rod (16). A pair of pivoting J-shaped arms (21a, b) are then actuated which bend the lower portions of the clip (1) around the lower rod (17) securing the two rods (16, 17) together.

14 Claims, 4 Drawing Sheets

ROD CLIP AND APPARATUS

This invention relates to fastening. In particular, it is directed to a fastening clip and an apparatus for use with that clip, the clip being used to fasten together crossing elongate members and has a specific, but not limiting, use to secure the lattice type structure of reinforcing rods of the type used in the construction of steel rod reinforced concrete slabs.

Concrete slabs as used in the foundation for a building or as a suspended ceiling or floor incorporate an open lattice or grid of steel rods for strength. To prevent these rods from sagging under the weight of the wet concrete until it has set, the rods are tied together. It is usual to secure each rod to each other rod that crosses it along its length. The usual securing method is, at each such intersection, to wrap a short length of wire around both rods and then tightly twist the ends to secure the rods in place. These wire tying operations are usually undertaken manually using some form of gripping device to twist the wire.

Even in relatively small constructions, the time taken to fabricate the reinforced steel lattice is significant adding noticeably to the overall cost of the building construction. Further disadvantages include (1) operator fatigue due to the large number of ties to be performed, thus effectively reducing the rate of tying and actually adding to the time and therefore cost of completing the construction; (2) muscular and related problems for the operator as the operator must bend over and/or squat in order to effect the tie; (3) tying is not uniform being dependent upon the efficiency of the operator, thus potentially leading to the aforementioned sagging of the rods before the concrete sets. Also, after the tie is made, the excess wire length is cut resulting in small lengths of wire which tend to settle to the base of the wet concrete slab. When this slab is a suspended floor, these wire remnants are visible on an exposed surface where they oxidise leading to unsightly rust stains. More time is thus consumed in removing these small fragments of wire.

One prior attempt to alleviate such disadvantages is to secure the rods together by welding. However, welding of such load bearing structures is banned in some countries as it may alter the temper and thus strength of the metal in and adjacent to the weld zones. Other disadvantages include (1) operators are exposed to the noxious welding gases and must have frequent periodic medical checks; (2) there is a wastage of material if a mistake is made as a weld cannot be reversed; (3) the welding flame, because of the potential damage that it can inflict to an unshielded eye, must be screened from passers-by; and (4) it still fails to alleviate the muscle fatigue of the operator.

Another prior art attempt to overcome these disadvantages is disclosed in U.S. Pat. No. 3,169,559 wherein a tool is described which automatically twists the ends of a substantially U-shaped clip placed on the two crossing members. However, this tool is only of limited use as the tool head must pass through the gaps of the lattice work to function thus preventing its use on close-knit lattice work. Further, the clips are placed diagonally on the cross members leading to poor stability because of the reduced contact between the clip and rod. Another disadvantage is that the tool twists but does not sever the dip ends thus requiring a second separate cutting action to complete the fastening process.

Yet another prior art attempt to resolve at least some of these disadvantages is described in U.S. Pat. No. 4,653,548 and its Australian equivalent 574043 whereby the ends of two arms of a wire clip can be twisted and the ends severed as the final phase of the fastening. However, this solution still requires two distinct manual operations, the first is the positioning of the clip where required and the second is the actual engagement of the clip with the tool. The cut ends are also still not contained and therefore have to be removed in a third operation if necessary.

It should also be noted that all of these prior art attempts are only applicable to the use of a wire which can only provide limited strength capabilities.

It is thus a general object of the present invention to overcome, or at least ameliorate, one or more of the above-mentioned disadvantages.

According to a first aspect of the present invention, there is provided a clip for use in the fastening together of two crossing substantially elongate upper and lower members, said dip including a body with a recess extending from a first face to near a second face substantially opposite said first face to form a first arm and a second arm, said recess terminating with a shaped portion of a configuration substantially complementary to the exterior surface of said upper member wherein, when said clip is in a fastened position, said recess can engage said upper member and said first arm and said second arm can engage said lower member sufficient to fasten said upper member and said lower member together.

Preferably, said body is substantially polygonal in elevation.

Preferably, said polygonal elevation is rectangular.

Preferably, said shaped portion is substantially arcuate in elevation.

Preferably, said recess converges from said first face to near said second face.

According to a second aspect of the present invention, there is provided an apparatus to install a clip as hereinbefore described, said apparatus including a base plate which has an aperture through which an intersection of a said upper member with a said lower member can be viewed;

retaining means to retain at least one of said clip;

positioning means to enable a said clip to be released from said retaining means and pass through said aperture to be positioned on said upper member at said intersection; and securing means to secure said first arm and said second arm to said lower member when a said clip has been positioned at said intersection.

Preferably, said base includes a locating means to assist in locating said apparatus at a required said intersection.

More preferably, said retaining means retains a plurality of said clip.

Preferably, said positioning means includes a shearing means adapted to shear sequentially a series of said clip from said retaining means.

Preferably, said securing means includes a first lever which can engage and bend said first arm to engage said lower member and a second lever which can engage and bend said second arm to engage said lower member, engagement of said first and second arm with said lower member being sufficient to fasten together said lower member and said upper member.

Preferably, said apparatus includes a handle from which said positioning means and said securing means can be operated.

In a first embodiment of the apparatus of the present invention, positioning of said clip and subsequent engagement of said first arm and said second arm with said lower member is undertaken mechanically.

In a second embodiment of the apparatus of the present invention, positioning of said clip and subsequent engagement of said first arm and said second arm with said lower member is undertaken hydraulically.

In a third embodiment of the apparatus of the present invention, the operation of the apparatus can be undertaken electrically, electronically or by gas power.

As a third aspect of the present invention, there is provided a method of fastening together two crossing substantially elongate upper and lower members wherein a clip as hereinbefore described is secured at an intersection of said lower and upper member using an apparatus as hereinbefore described.

A fourth aspect of the present invention is the provision of a lattice-type arrangement comprising a series of crossing lower and upper members wherein each intersection of said upper and lower member has been fastened with a clip as hereinbefore described.

Preferred embodiments of the present invention will now be described with reference to the accompanying drawings, wherein.

Figure 1:
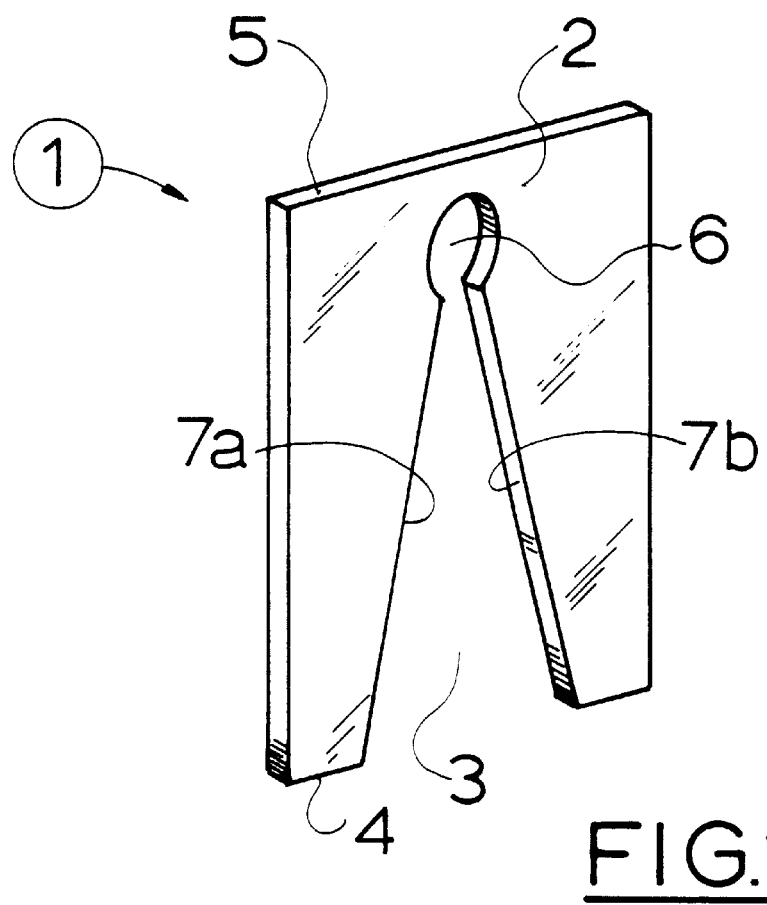
FIG. 1 illustrates a first embodiment of a clip constructed in accordance with the present invention.

Referring first to FIG. 1, a clip (1) comprises a substantially rectangular body (2). A recess (3) extends from a first face (4) of the body (2) towards an opposite face (5). The recess (3) terminates in an arcuate portion (6). The inner edges (7a,b) of the recess (3) are convergent towards the arcuate portion (6).

Figure 2:
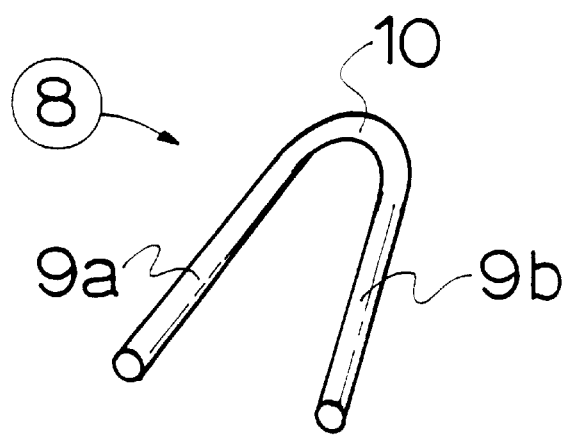
FIG. 2 illustrates a second embodiment of a clip constructed in accordance with the present invention.

In the second embodiment depicted in FIG. 2, the clip (8) is an elongate member of essentially circular cross section bent in the form of a V to provide two divergent arms (9a,b). The closed end (10) of the clip (8) is arcuate.

Figure 3:
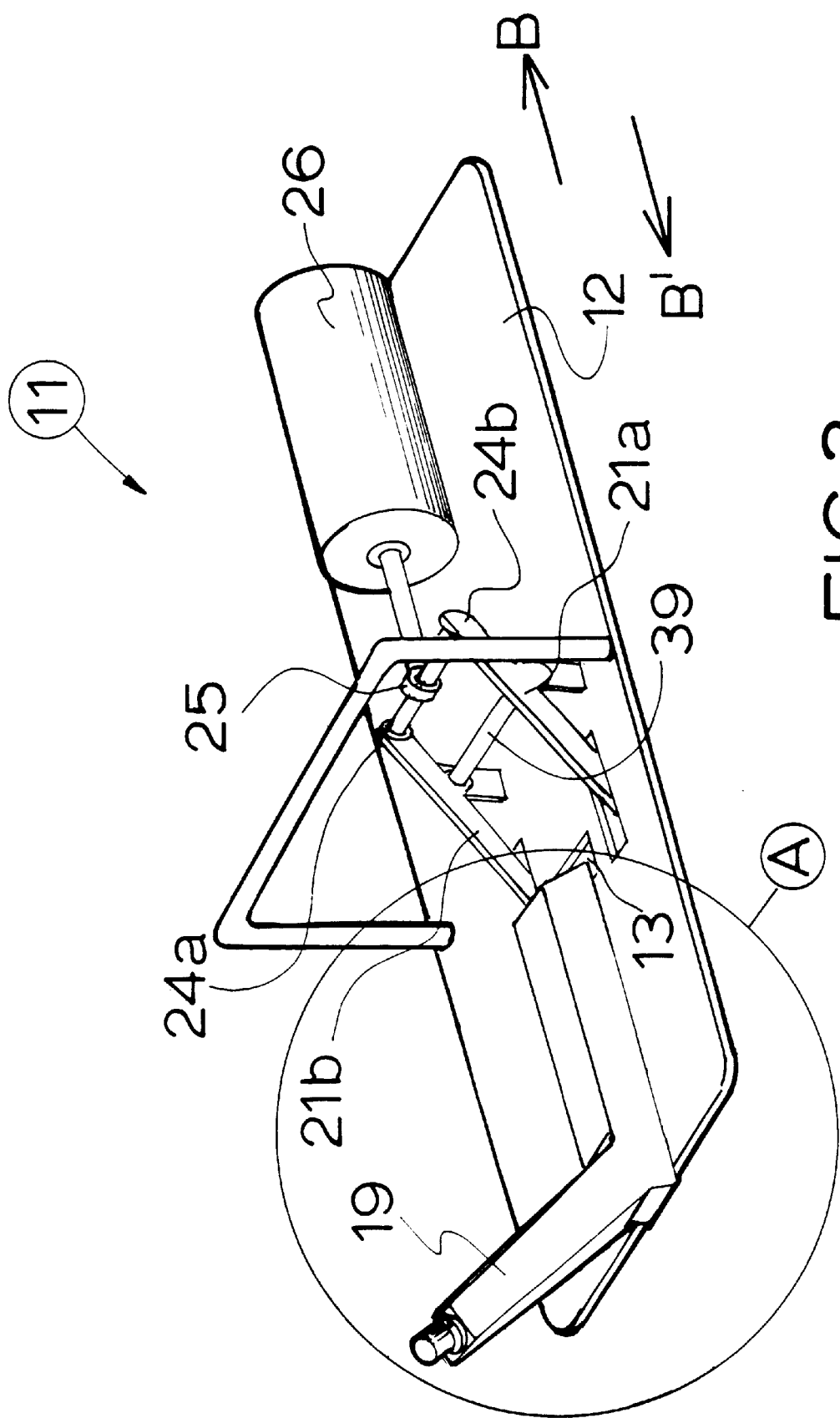
FIG. 3 is an upper perspective sketch of an apparatus constructed in accordance with the present invention.
Figure 4:
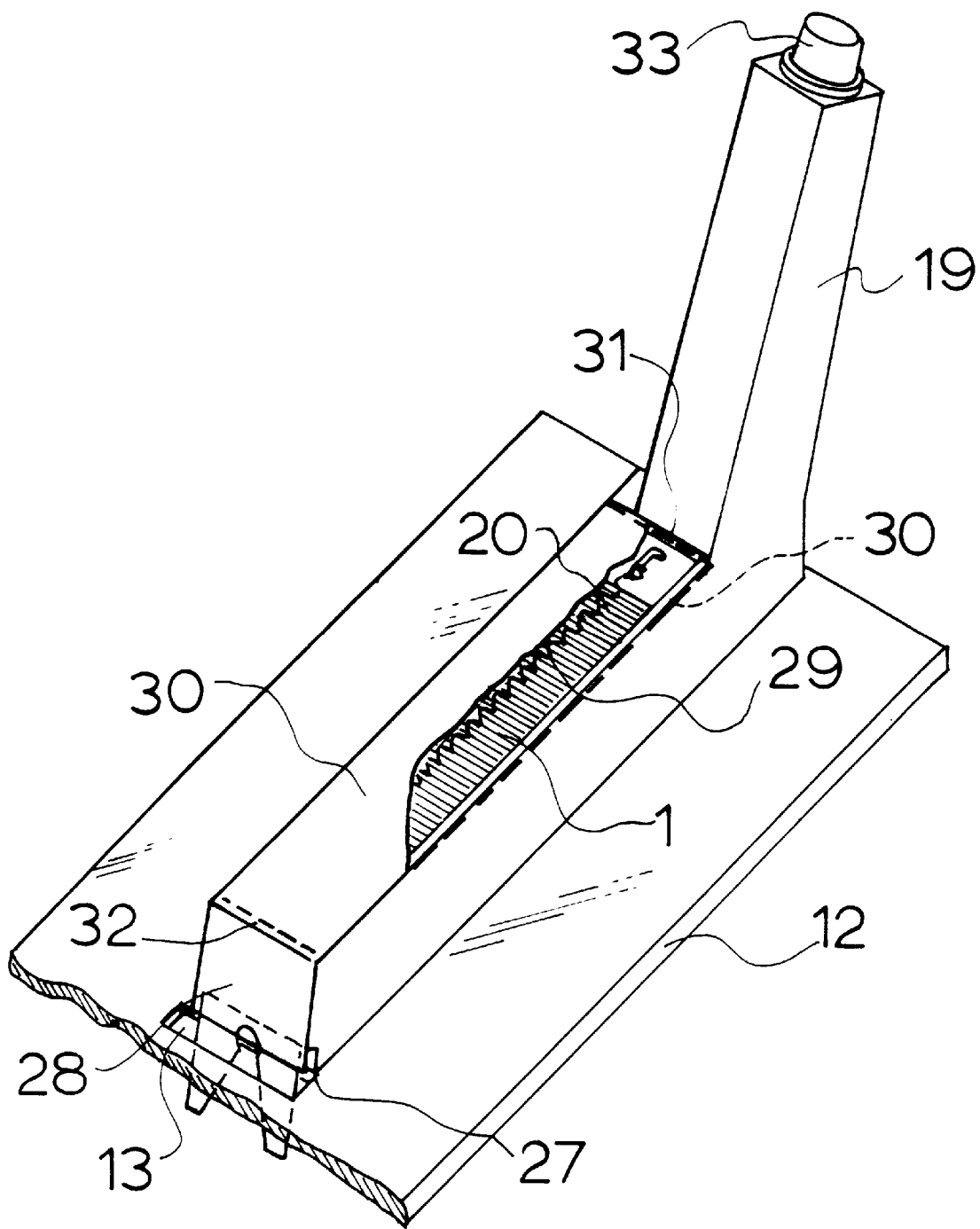
FIG. 4 is an enlargement of the area A of the apparatus of FIG. 3.
Figure 5:
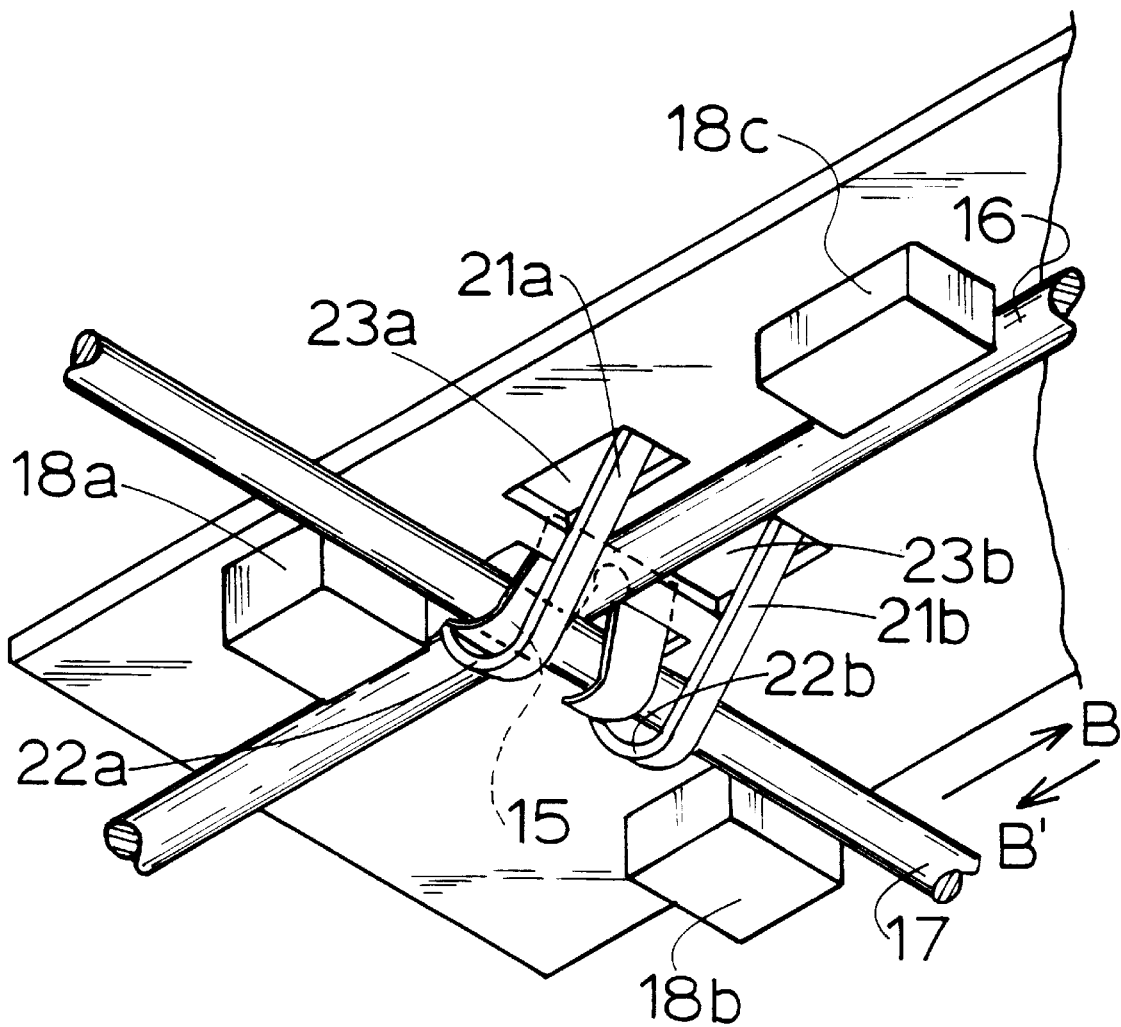
FIG. 5 is a lower perspective sketch of the apparatus of FIG. 3.

The apparatus (11) depicted in FIGS. 3–5 comprises a base plate (12) which includes a first rectangular aperture (13). The aperture (13) is of dimensions sufficient to enable an operator of the apparatus (11) to view the intersection (15) of a first upper steel rod (16) and a second lower steel rod (17) (FIG. 5) and also to allow a clip (1) to pass therethrough. A pair of stops (18a,b) are affixed to the lower surface of the plate (12) which can abut the lower rod (17). A third stop (18c) is also affixed to the lower surface of the plate (12) to abut the upper rod (16). When the stops (18a,b,c) are in their respective engagement with the upper and lower rods (16, 17), the intersection (15) is positioned substantially centrally within the aperture (13) and in the correct position for subsequent use of the apparatus. A handle (19) is affixed to the upper surface of the plate (12) by any convenient bracket (not illustrated). Supported on the plate (12) are a plurality clips (1) contained within a magazine (20). The clips (1) may be taped or otherwise adhered together for stability within the magazine (20). A slot (27), of sufficient dimensions to allow a clip (1) to pass through, is present near the front (28) of the magazine (20). A biasing spring (29) or similar is retained within the magazine which can bias the remaining clips (1) in the magazine to the front (28) as each clip (1) is discharged through the slot (27). A cover (30) is pivotally connected at the rear end (31) of the magazine (20) and incorporates a shearing plate (32) at the front (28) of the cover (30). The cover (30), in its rest state, is biased upwards to allow the shearing plate (32) to be positioned above the next clip (1) to be discharged from the magazine (20) through the slot (27). The pivoting cover (30) is connected to an actuator (not illustrated) which can be operated by a two stage switch (33) on the handle (19) by any convenient means known in the art. A first J-shaped arm (21a) has its curved end (22a) passing through a second aperture (23a) in the base plate (12). A second J-shaped arm (21b) has its curved end (22b) passing through a third aperture (23b) in the base plate (12). The other ends (24a,b) of the two J-shaped arms (21a,b) are connected together by, and can pivot about, a common arm (39) affixed to the plate (12). The ends (24a,b) are further connected to a second common arm (25) which, in turn, is connected to a hydraulic actuator (26) which can pull the arms (21a,b) in the direction B upon actuation and which allows the arms (21a,b) to move in the direction B' upon de-actuation thus returning the arms (21a,b) to their original position. The actuator (26) is also operated by the two stage switch (33) on the handle (19) by any convenient means known in the art.

In use, a series of first elongate steel rods (16) and second elongate steel rods (17) are positioned to form a lattice-like arrangement well known in the art of forming a steel reinforced concrete slab. The apparatus (11) is positioned near the vicinity of an intersection (15) and its position is adjusted until the stops (18a,b,c) engage the respective upper (16) and lower (17) rods, thus positioning the intersection (15) essentially centrally within the aperture (13). Setting the switch (33) to its first operative stage biases the cover (30) of the magazine (20) downwards, causing the shearing plate (32) to bear upon the upper surface of a clip (1) and shearing that clip (1) from the front of the stack pushing the clip (1) through the aperture (13) where the internal edges of the arcuate portion (6) of the clip (1) engage the upper surface of the upper rod (16) and the internal edges (7a,b) of the recess (6) straddle the upper rod (16) and engage the lower rod (17). The cover (30) returns to its original rest position and the biasing spring (29) biases the remaining stack of clips (1) to bring another clip under the shearing plate (32). Moving the switch (33) to its subsequent second operative stage engages the actuator (26) causing the J-shaped arms (21a,b) to move in the direction B simultaneously bending the lower regions of the arms (21a,b) around the lower rod (17) thus securing the two rods (16,17) together. Returning the switch (33) to its original rest position disengages the actuator (26) causing the J-shaped arms (21a,b) to return to their original positions. The apparatus (11) can then be moved to a next intersection (15) to repeat the fastening process.

A similar process operates when the second embodiment of the clip as illustrated in FIG. 2 is used. In this embodiment, the closed end (10) of the clip (8) rests on the upper rod (16) and the arms (9a,b) are drawn around the lower rod (17) by the J-shaped arms (21a,b).

In both embodiments, the clips (1) are of dimensions such that the respective closed ends (6, 10) rest on the upper rod (16) between the strengthening ridges that are usually present on such reinforcing rods.

By using the present invention, a number of advantages are offered including (a) it is not necessary to restrict the clips to a wire like configuration; clips of a more substantial weight offering a greater purchase on the members can be used leading to a more secure fastening; (b) the handle can easily be constructed of a length, adjustable if required, to enable the operator to remain in an upright position; (c) positioning and subsequently fastening of the clip can be undertaken in a single operation; and (d) no cutting of the clip is required after fastening.

It will be appreciated that the above described embodiments are only exemplification of the various aspects of the present invention and that modifications and alterations can be made thereto without departing from the inventive concept as defined in the following claims.

What is claimed is:

1. A clip for use in the fastening together of two crossing substantially elongate upper and tower members, said clip including a substantially planar body with a recess extending from a first face to near a second face substantially opposite said first face to form a first arm and a second arm, said recess terminating with a shaped portion of a configuration substantially complementary to the exterior surface of said upper member, said clip being adapted such that, when said clip is in a fastening position, said recess can engage said upper member and said first arm and said second am can each be conformed to a configuration substantially identical to the exterior surface of said lower member sufficient to engage with said lower member to fasten said upper member and said lower member together.

2. A clip as defined in claim 1 wherein said body is substantially polygonal in elevation.

3. A clip as defined in claim 2 wherein said polygonal elevation is rectangular.

4. A clip as defined in claim 1 wherein said shaped portion is substantially arcuate in elevation.

5. A clip as defined in claim 1 wherein said recess converges from said first face to near said second face.

6. An apparatus to install a clip as defined in claim 1, said apparatus including:
   (a) a base plate having an aperture through which an intersection of a said upper member with a said lower member can be viewed;
   (b) retaining means to retain at least one of said clip;
   (c) positioning means to enable a said clip to be released from said retaining means and pass through said aperture to be positioned on said upper member at said intersection; and
   (d) securing means to secure said first arm and said second arm to said lower member when a said clip has been positioned at said intersection.

7. An apparatus as defined in claim 6 wherein said base includes a locating means to assist in locating said apparatus at a required said intersection.

8. An apparatus as defined in claim 6 and further including a handle from which said positioning means and said securing means can be operated.

9. An apparatus as defined in claim 6 wherein said retaining means retains a plurality of said clip.

10. An apparatus as defined in claim 6 wherein said positioning means includes a shearing means adapted to shear sequentially a series of said clip from said retaining means.

11. An apparatus as defined in claim 6 wherein said securing means includes a first lever which can engage and bend said first arm to engage said lower member and a second lever which can engage and bend said second arm to engage said lower member, engagement of said first and second arm with said lower member being sufficient to fasten together said lower member and said upper member.

12. An apparatus as defined in claim 6 wherein positioning of said clip and subsequent engagement of said first arm and said second arm with said lower member is undertaken mechanically.

13. A method of fastening together two crossing substantially elongate upper and lower members, said method comprising:
   (a) aligning said members within an apparatus as defined in claim 6, such that said upper member is in contact with, and positioned perpendicularly to, said lower member to form an intersection at which said members are to be fastened together; and
   (b) securing a clip held within said apparatus at said an intersection of said lower and upper members using said apparatus, wherein said clip includes a substantially planar body with a recess extending from a first face to near a second face substantially opposite said first face to form a first arm and a second arm, said recess terminating with a shaped portion of a configuration substantially complementary to an exterior surface of said upper member, said clip being adapted such that, when said clip is in a fastening position, said recess can engage said upper member and said first arm and said second am can each be conformed to a configuration substantially identical to an exterior surface of said lower member sufficient to engage with said lower member to fasten said upper member and said lower member together.

14. A lattice-type arrangement comprising a series of crossing lower and upper members wherein each intersection of said upper and lower member has been fastened with a clip, said clip including: a substantially planar body with a recess extending from a first face to near a second face substantially opposite said first face to form a first arm and a second arm, said recess terminating with a shaped portion of a configuration substantially complementary to the exterior surface of said upper member, said clip being adapted such that, when said clip is in a fastening position, said recess can engage said upper member and said first arm and said second am can each be conformed to a configuration substantially identical to the exterior surface of said lower member sufficient to engage with said lower member to fasten said upper member and said lower member together.

* * * * *